United States Patent
Gagne et al.

(10) Patent No.: US 9,877,147 B2
(45) Date of Patent: *Jan. 23, 2018

(54) SUPPORT FOR WISPR ATTRIBUTES IN A TAL/CAR PWLAN ENVIRONMENT

(71) Applicant: Cisco Technology, Inc., San Jose, CA (US)

(72) Inventors: Francois Gagne, Casselman (CA); Yi Huang, Chapel Hill, NC (US); Chandra Sekhar Buduguru, Bangalore (IN); Edwin J. Van Horne, III, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/582,078

(22) Filed: Dec. 23, 2014

(65) Prior Publication Data

US 2015/0181377 A1    Jun. 25, 2015

Related U.S. Application Data

(63) Continuation of application No. 11/323,416, filed on Dec. 30, 2005, now Pat. No. 8,924,459.

(30) Foreign Application Priority Data

Oct. 21, 2005    (IN) .......................... 2820/DEL/2005

(51) Int. Cl.
*H04W 4/02*    (2009.01)
*H04W 4/20*    (2009.01)
(Continued)

(52) U.S. Cl.
CPC ............... *H04W 4/02* (2013.01); *H04W 4/20* (2013.01); *H04L 63/08* (2013.01);
(Continued)

(58) Field of Classification Search
CPC ......... H04W 4/02; H04W 4/20; H04W 84/12; H04W 88/08; H04W 64/00; H04L 67/18; H04L 63/08; H04L 63/0853
See application file for complete search history.

(56) References Cited

U.S. PATENT DOCUMENTS 6,119,160 A * 9/2000 Zhang ..................... H04L 12/14
709/224
6,377,982 B1    4/2002 Rai et al.
(Continued)

OTHER PUBLICATIONS

Rigney, C., et al., "Remote Authentication Dial in User Service (RADIUS)," RCF: 2865, Jun. 2000, pp. 1-76.

*Primary Examiner* — Parth Patel
*Assistant Examiner* — Kai Chang
(74) *Attorney, Agent, or Firm* — Polsinelli PC

(57) ABSTRACT

A computer configured to serve data services in a one-way cable plant having telco-return for upstream data resources to requesting computers in a networked environment is disclosed. The computer includes a subscriber edge services manager server and a radius proxy server, the radius proxy configured to classify received radius requests into a plurality of types and handle requests classified as a first type from requests classified as non-first types. The computer also includes an access point, the access point providing communication connection to at least one computing device. The subscriber edge services manager server and radius proxy server are configured to communicate with the access point to acquire information from the access point, and user location information is configured on the access point in a vendor-specific attribute.

12 Claims, 2 Drawing Sheets

(51) Int. Cl.
*H04W 64/00* (2009.01)
*H04W 84/12* (2009.01)
*H04W 88/08* (2009.01)
*H04L 29/06* (2006.01)
*H04L 29/08* (2006.01)

(52) U.S. Cl.
CPC .......... *H04L 63/0853* (2013.01); *H04L 67/18* (2013.01); *H04W 64/00* (2013.01); *H04W 84/12* (2013.01); *H04W 88/08* (2013.01)

(56) References Cited

U.S. PATENT DOCUMENTS

| | | | |
|---|---|---|---|
| 6,636,894 | B1 | 10/2003 | Short et al. |
| 6,684,250 | B2 | 1/2004 | Anderson et al. |
| 6,757,518 | B2 | 6/2004 | Spratt et al. |
| 6,816,460 | B1 | 11/2004 | Ahmed et al. |
| 7,042,879 | B2 | 5/2006 | Eschbach et al. |
| 7,062,565 | B1 | 6/2006 | Ravindranath et al. |
| 7,110,398 | B2 | 9/2006 | Grand et al. |
| 7,206,826 | B1 | 4/2007 | Parker et al. |
| 7,310,307 | B1 | 12/2007 | Das et al. |
| 7,505,431 | B2 | 3/2009 | Chitrapu et al. |
| 7,565,407 | B1 * | 7/2009 | Hayball ............ G06F 17/30902 709/200 |
| 7,668,832 | B2 | 2/2010 | Yeh et al. |
| 7,716,723 | B1 | 5/2010 | Taylor et al. |
| 7,720,960 | B2 * | 5/2010 | Pruss ..................... G06Q 20/28 455/403 |
| 7,996,531 | B2 | 8/2011 | Freedman |
| 8,074,259 | B1 * | 12/2011 | Levy ....................... H04L 63/08 726/2 |
| 8,571,222 | B1 | 10/2013 | Perry et al. |
| 2001/0014911 | A1 * | 8/2001 | Doi et al. ....................... 709/221 |
| 2002/0035699 | A1 | 3/2002 | Crosbie |
| 2002/0107944 | A1 * | 8/2002 | Bai ........................ H04L 29/06 709/220 |
| 2002/0164952 | A1 | 11/2002 | Singhal et al. |
| 2002/0167919 | A1 | 11/2002 | Marples et al. |
| 2003/0079021 | A1 * | 4/2003 | Fan ........................ H04L 63/08 709/227 |
| 2003/0233461 | A1 | 12/2003 | Mariblanca-Nieves et al. |
| 2004/0028055 | A1 * | 2/2004 | Madour .................. H04L 63/08 370/395.21 |
| 2004/0073651 | A1 | 4/2004 | Beaulieu et al. |
| 2004/0114567 | A1 | 6/2004 | Kubler et al. |
| 2004/0193513 | A1 | 9/2004 | Pruss et al. |
| 2004/0193712 | A1 * | 9/2004 | Benenati ............ H04L 63/0815 709/225 |
| 2004/0196806 | A1 | 10/2004 | Loeffler et al. |
| 2004/0236850 | A1 * | 11/2004 | Krumm et al. ................ 709/224 |
| 2004/0242228 | A1 * | 12/2004 | Lee ........................ H04L 63/062 455/432.1 |
| 2005/0064845 | A1 * | 3/2005 | Clingerman ............ H04L 63/08 455/408 |
| 2005/0076339 | A1 * | 4/2005 | Merril .................. H04L 12/5695 718/104 |
| 2005/0124288 | A1 * | 6/2005 | Karmi .................. H04L 12/5692 455/3.01 |
| 2005/0177515 | A1 * | 8/2005 | Kalavade et al. ............ 705/52 |
| 2006/0003765 | A1 * | 1/2006 | Patil ........................ H04W 8/12 455/432.1 |
| 2006/0041556 | A1 | 2/2006 | Taniguchi et al. |
| 2006/0059092 | A1 | 3/2006 | Burshan et al. |
| 2006/0069782 | A1 * | 3/2006 | Manning et al. ............. 709/227 |
| 2006/0174127 | A1 | 8/2006 | Kalavade et al. |
| 2006/0233166 | A1 * | 10/2006 | Bou-Diab et al. ............. 370/389 |
| 2006/0245406 | A1 * | 11/2006 | Shim .................. H04L 63/0272 370/338 |
| 2006/0256763 | A1 * | 11/2006 | Nguyen .................. H04L 63/06 370/338 |
| 2007/0088834 | A1 | 4/2007 | Litovski et al. |
| 2007/0233883 | A1 * | 10/2007 | De Lutiis .............. H04L 63/102 709/229 |
| 2008/0043758 | A1 * | 2/2008 | Giaretta .................. H04L 63/08 370/400 |
| 2008/0298313 | A1 * | 12/2008 | Salminen ................ H04L 63/08 370/329 |
| 2009/0104892 | A1 * | 4/2009 | Jones ...................... H04L 12/24 455/412.1 |
| 2013/0058274 | A1 * | 3/2013 | Scherzer ................ H04W 12/08 370/328 |
| 2013/0285855 | A1 * | 10/2013 | Dupray et al. .................. 342/451 |

\* cited by examiner

SUPPORT FOR WISPR ATTRIBUTES IN A TAL/CAR PWLAN ENVIRONMENT

CROSS-REFERENCE TO RELATED APPLICATIONS

This application is a continuation of U.S. patent application Ser. No. 11/323,416, filed on Dec. 30, 2005, which claims priority to Indian Application Serial Number 2820/DEL/2005, filed Oct. 21, 2005.

FIELD

The present invention relates broadly to computer networks. Specifically, the present invention relates to communicating location information for users of wireless computing devices and providing location-based services to those wireless computing devices.

BACKGROUND

Wireless LAN access networks are being deployed in public places such as airports, hotels, shopping malls, and coffee shops by a diverse set of operators such as cellular carriers, wireless Internet service providers and fixed broadband operators. These networks are referred to herein as public wireless local area networks (PWLANs).

When a user executes the network access authentication procedure to such a network, information about the location and operational ownership of this network is conveyed to the user's home network to which the user has a contractual relationship.

PWLAN service providers have expressed interest in offering location-based services using WISPr attributes. The location of a wireless client is based on the AP with whom the client is associated. This location can be configured on the AP and carried through the network using the Location-ID and Location-Name RADIUS vendor-specific attributes (VSAs) recommended by the Wi-Fi Alliance WISPr hot-spot service provider roaming initiative. The attributes are included in "Accounting Request" (Start/Update/Stop), "Access Request" and "Access Accept" messages. A client's location can be used in public access networks to display logon page and enforce white lists based on client's location; to enable auto-logon services based on client's location; to bill a client with a tariff that varies based on his location; to support roaming billing arrangements between service providers; and other applications. The location attributes can be used by a number of application servers. Such application servers generally functions as portals, billing servers, subscriber service repository or policy enforcement points.

When subscriber edge services manager (SESM) is used to offer portal services, it needs the location information of a user (based on AP within a hot spot) in order to present a user a web page that may be access location dependent. In the wholesale model, this is commonly used to provide portals from different providers to the user. This tailors the portal to a specific location or group of interest, such as an airport lounge or a hotel chain. The SESM also needs the location information to implement an accepted URL that is known in the art as a "white URL" per each location, and also to automatically associate services to a user based on his location.

Prior solutions have relied on a L2 Switch relaying switch/port ID using option 82 so DHCP server can associate specific address ranges to an AP. However, this approach suffers serious shortcomings. This solution is difficult to administer, as the application server using this information to offer location-based service must be reconfigured every time an AP is added or moved. Such application servers must often correlate different address ranges and then apply same policies across these different address ranges. Also, a L2 Switch is not always used between an AP and an AZR. Finally, the approach simply does not work for static IP users.

SUMMARY

The present invention solves the problems described above by disassociating IP address assignment with location-based services. The present invention improves ease of configuration as no manual correlation is needed between assigned IP address (network addressing) and application server configuration. The present invention works regardless of whether NAT is used, thus accommodating static IP users. The present invention also makes it easier to apply the same policies to a group of users that are geographically dispersed but share common interests.

The Cisco Access Registrar (CAR) is a server that provides RADIUS services for the deployment of high-speed data services in a one-way cable plant requiring telco-return for upstream data. A service selection gateway (SSG) is a software feature set that implements service selection and subscriber management services. SSG stateful failover is implemented using the SSG transparent auto-login (TAL) feature and a cache engine using CAR. The present invention implements the cache engine using CAR to store the SSG session's state. By supporting WISPr attributes in a TAL/CAR environment, user location information that is configured on an access point (AP) can be cached on an upstream system and redistributed as needed to other systems and applications within the network to implement various location-based services.

In one aspect, the present invention provides an access point that supports RADIUS vendor-specific attributes (VSAs). One attribute, referred to herein as the WISPr attribute "NAS_Location," is a configurable character string that contains information pertaining to PWLAN location and operational ownership. The user service information is also carried via the SSID WISPr attribute. Location is configured on the access point via a snmp-server location command or via command line interface. This location is sent via RADIUS in accounting request records such as start, stop, and update.

In another aspect, the present invention provides a server having an SESM and a RADIUS proxy (RDP) to acquire information from the access point. The RDP is a lightweight RADIUS server that provides a way to separate RADIUS requests into different request types, and to handle each request type in different ways. Different request types (authentication, accounting, and service profile requests) can be proxied to different sources. In addition, the domain-based proxy feature allows a further separation of requests according to domains.

Location ID is stored centrally within the SESM cache engine, so that the SESM can efficiently retrieve location information as needed. In this respect, the SESM functions as an authorization server for TAL. Once a session is created, location information is retrieved through its correlation with a client's MAC address and location-based services are applied by configuring the SSG to enforce policies.

The present invention provides several embodiments that implement WISPr using TAL. In an embodiment, WISPr attributes are stored on CAR only and applications utilize WISPr to query CAR to get the information. This embodiment operates on the assumption that the application requiring a client's location queries CAR to get this information. As the SESM queries CAR to get service profile, the SESM queries CAR directly for the location information.

In the preferred embodiment, the information is stored on both CAR (for recovery) and on SSG so that SSG can include this information in RADIUS messages for the applications to use it. In this embodiment, the SSG serves as a temporary cache since the location attributes are sent before the HO is created. The SSG serves as RADIUS proxy to process the Accounting Stop messages generated from Authorized ARP feature on AZR. The SSG serves as RADIUS Proxy for the AZR and AP accounting messages but not for EAP authentication. In the preferred embodiment, WISPr attributes are stored on CAR and also on SSG upon reception of Accounting Start from the AP.

Many other features and advantages of the present invention will become apparent from reading the following detailed description, when considered in conjunction with the accompanying drawings, in which:

DETAILED DESCRIPTION

The following description of call flows occur between client 100, and a PWLAN that includes access point (AP) 102, access zone router (AZR) 104, which serves as the first hop router in the PWLAN, SSG 106 (which is also a TAL client), SESM 108, and CAR 110. ITP/HLR module 112 is included in embodiments that authenticate EAP-SIM authentication flows. In an embodiment, the present invention is implemented in a telco-return environment. As referred to herein, telco-return is a communication technique that provides downstream dataflow from cable modem cards connected to the network's cable system and accepts upstream traffic via a combination of the local packet switched telecommunication network (PSTN) and IP network path. Upstream data is effected through a telephone modem connected to an analog telephone line which gives cable companies that have not upgraded their cable plants to bidirectional amplifiers, the ability to offer fast downstream data services via the cable plant and upstream transmission via the PSTN.

Figure 1:
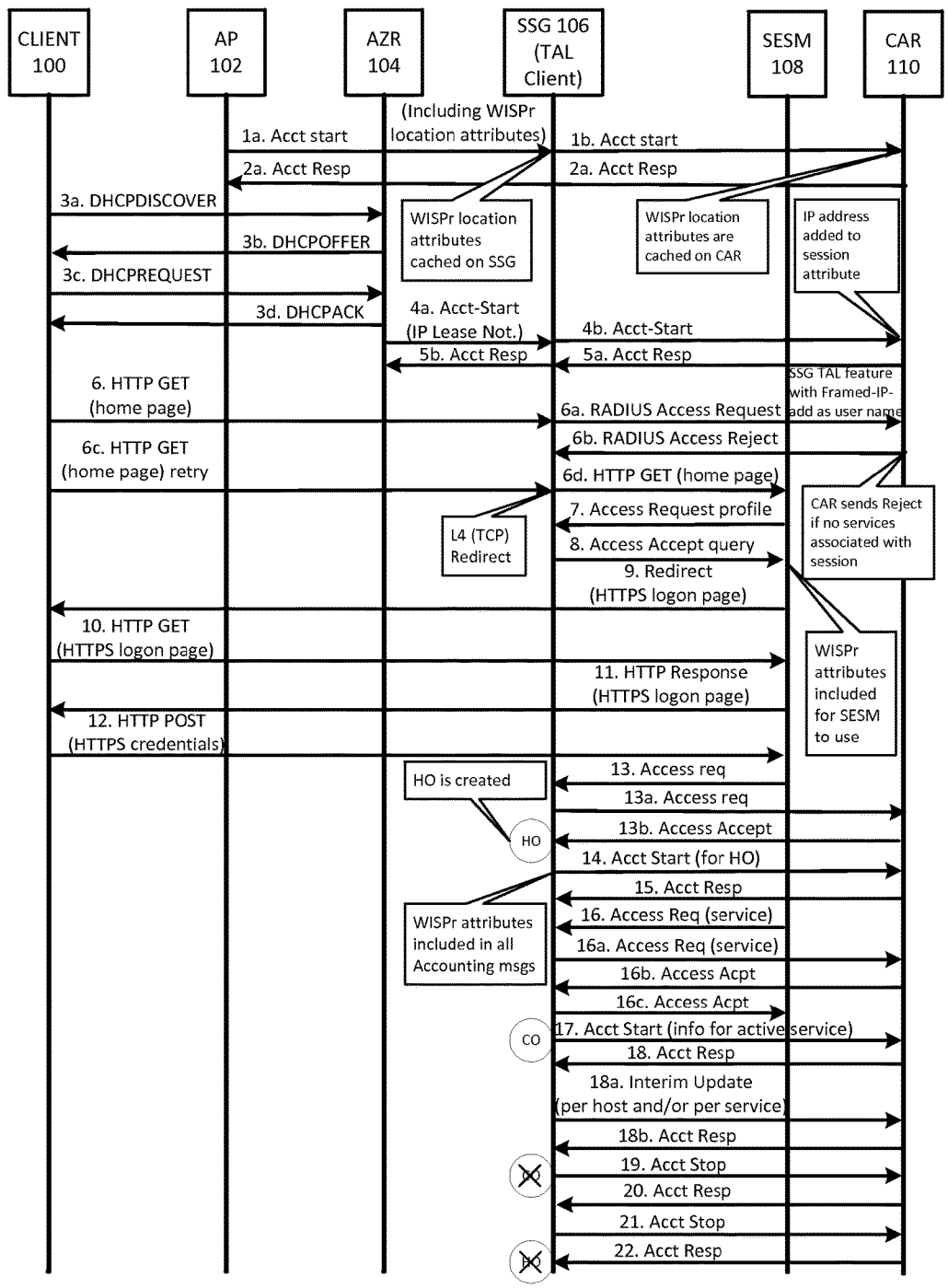
FIG. 1 illustrates web-based authentication call flows between client and server in accordance with an embodiment of the present invention.
Figure 2:
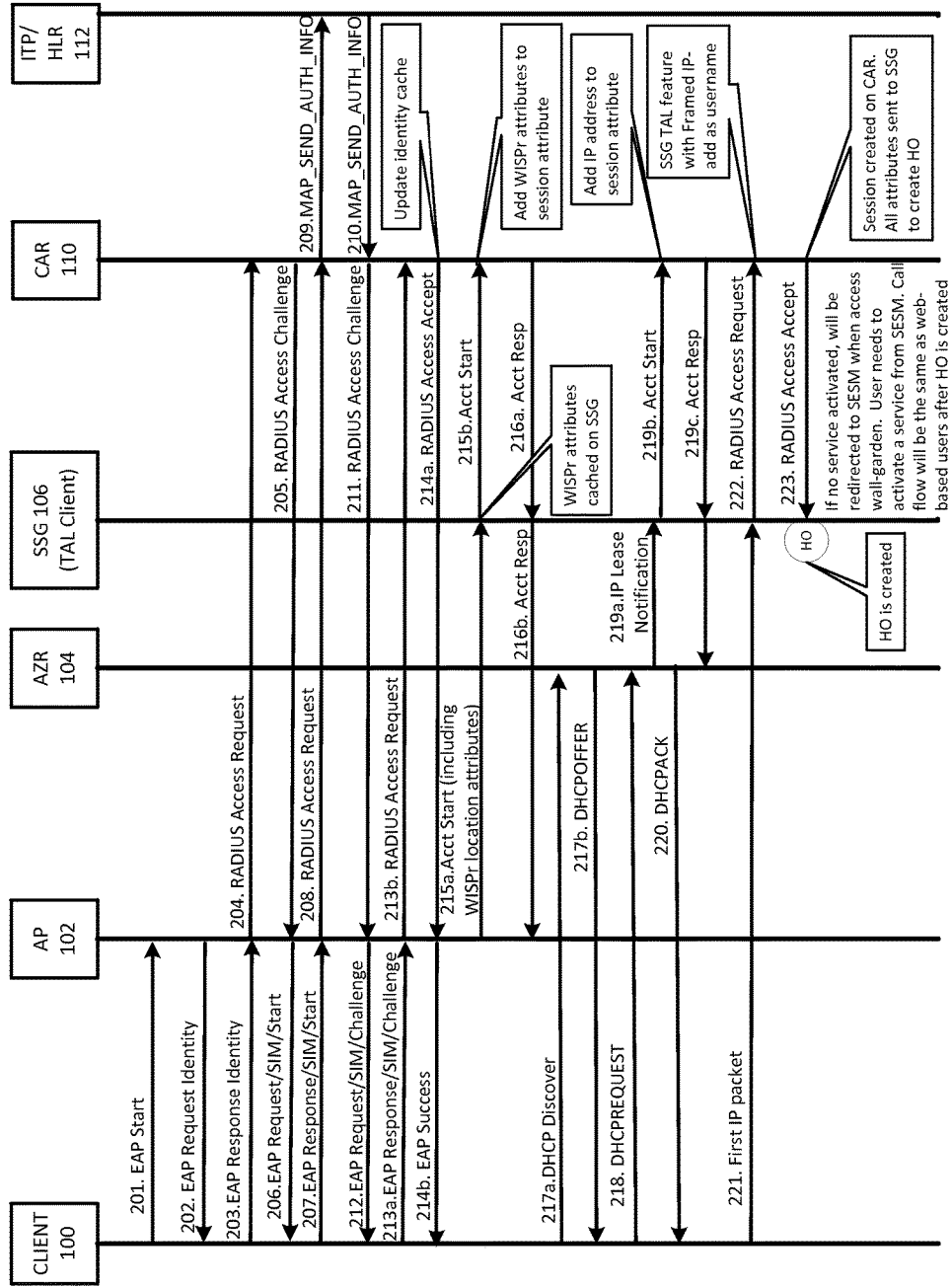
FIG. 2 illustrates EAP-SIM authentication call flows in accordance with embodiments of the present invention.

Directing attention to FIGS. 1 and 2, attributes are stored on SSG 106 when AP 102 sends an "Accounting Start" message as illustrated by message 1a in FIG. 1 and message 215a in FIG. 2). Attributes are stored on CAR 110 upon reception of "Accounting Start" message as shown in message 1b in FIG. 1 and message 215b in FIG. 2.

In the preferred embodiment, when TAL is used, SSG 106 includes the WISPr attributes in Status Query responses to SESM as shown in message 8 in FIG. 1. SESM 108 ignores those attributes if they cannot be interpreted. SSG 106 includes the WISPr attributes in RADIUS Access Request messages and in RADIUS Accounting messages in FIG. 1. Accounting and billing servers ignore those attributes if they cannot be interpreted. SSG 106 and CAR 110 update by overwriting the user location upon reception of a new Accounting Start message, for example, in cases where a user roams.

When a user roams at from one AP to another at L2, his "location" changes and a new "Accounting Start" is generated from AP 102 to SSG 106 to CAR 110 when client 110 associates with the new AP. The new location is recorded in both SSG 106 and CAR 110, but the location-based application may not use it until the user re-authenticates. This is acceptable as the location-based services are unlikely to be different from one AP to another within the same L2 domain. Accounting Start messages include all user prepaid information that needs to be stored in CAR 110.

AZR 104 can recover its ARP table after a re-boot by reloading its configuration from a TFTP server. After the re-boot, an accounting off is sent to SSG 106. SSG 106 logs off all users from AZR 104 (deleting the session on CAR 110) but puts the sessions in an inactive state for a configurable period of time. If AZR 104 is successful in recovering the ARP table, it sends an accounting start for each session. If the timer has not yet expired, SSG 106 restores the session and sends an accounting start to CAR 110. This accounting start contains all user information, including the WISPr attributes and all user services.

In an embodiment, clients run wireless-equipped devices such as laptops or PDAs. The clients typically authenticate through web browser redirection, such as Universal Access Method by 3GPP or IEEE 802.1x port-based access. In the latter case, the client device runs supplicant software, AP 102 acts as an authenticator and CAR 110 performs the function of an authentication server. For extremely simple wireless devices, such as barcode scanners, the PWLAN may be configured to recognize the MAC address of the device instead of requiring authentication.

In an embodiment, SSG 106 is deployed in a server farm between IOS RADIUS Load-Balancing (RLB) and Firewall Load-Balancing (FW-LB). This embodiment is useful for customers who require a higher session activation rate than a single SSG supports or redundancy in the aggregation section of the network to improve service availability. The RLB and FW-LB features are implemented on the Catalyst 6500 series layer 3 switches. FW-LB is also available on the Content Switching Module (CSM). RLB directs all EAP RADIUS traffic for a session through the same SSG. The FW-LB distributes traffic from the Internet to the correct SSG. In an embodiment, CAR 110 provides the AAA (RADIUS) backend for EAP-SIM in conjunction with the Cisco IP Transfer Point (ITP) and third party HLR devices (ITP/HLR module 112). SESM 108 provides a web portal for UAM (web-based). In an embodiment of the present invention utilizes a decentralized architecture, an edge router implements both AZR and SSG features.

The present invention offers the following advantages over the prior art. SSG 106 does not need to act as RADIUS-proxy for EAP authentication, this allow the use of various types of EAP authentication methods without attribute encryption concerns. Applications requiring the use of WISPr attributes do not need to query CAR 110; the attributes are sent to the respective applications by SSG 106. CAR 110 stores WISPr attributes in Accounting Start messages as per call flows in FIGS. 1 and 2. To support App_1, SESM 108 interprets the WISPr location of a wireless client based on WISPr attributes. This functionality does not need to be synchronized with the development on CAR 110 and SSG 106.

SESM 108 can display custom content based on the IP sub-network address of the client making the request from the portal. However, it is not practical use client IP address to determine the specific AP in use when more than one AP shares AZR 104 because the clients use the subnet associated with AZR 104. Also, changes in IP network address assignments are coordinated with content customization, complicating network administration. For these reasons, the present invention unambiguously determines the AP with which the client has associated is desirable. WISPr has defined vendor-specific RADIUS attributes that an AP may include in the session authentication and accounting data to identify the location of the AP.

FIG. 1 illustrates web-based authentication call flows. Execution begins when an Acct. start message with WISPr location attributes is sent by AP 102 to SSG 106 at act 1*a*. In an embodiment, these WISPr location attributes are cached on SSG 106. SSG 106 sends the Acct start message to CAR 110 at act 1*b*. In an embodiment, CAR caches these WISPr location attributes. CAR 110 responds with an Acct. Response message to SSG 106 at act 2*a*. SSG 106 then sends the Acct response message to AP 102 at act 2*b*. Acts 3*a*-3*d* include DHCP negotiation between client 100 and AZR 104. At act 4*a*, an Acct-Start message containing, in an embodiment, IP Lease Not., is sent from AZR 104 to SSG 106, which relays this message to CAR 110 in act 4*b*. In an embodiment, an IP address is added to the session attribute. At act 5*a*, an Acct Resp message is sent from CAR 110 to SSG 106, which passes this message to AZR 104 at act 5*b*. Act 6 shows a client's attempt to access wall-garden. The client's traffic is intercepted at SSG 106, which sends a RADIUS access request message with SSG-TAL feature of Framed-IP-add as user name at acts 6*a*. CAR 110 rejects the request at act 6*b* since no services are associated with the session. Upon retry at act 6*c*, SSG 106 redirects the request to SESM 108 in act 6*d*.

Acts 7 and 8 illustrate Access Request from SESM 108 to SSG 106 and SSG 106's response. WISPr attributes are included from SESM 108's use. A Redirect message from SESM 108 to client 100 (act 9) results in client 100's request at act 10. The response from SESM 108 (act 11) causes client 100 to present credentials to SESM 108 at act 12. At act 13, SESM 108 sends an access request to SSG 106. This access request is the subject of access request to and acceptance by CAR 110 at acts 13*a* and 13*b*. This results in the creation of a host object (HO). WISPr attributes are included in all accounting messages. SSG 106 then sends an Acct Start message on behalf of the HO (act 14) to CAR 110. CAR 110 responds at act 15 to SSG 106. SESM 108 and SSG 106 negotiate an access request for service at acts 16, 1*a*-16*c*. On behalf of the client object (CO), SSG 106 and CAR 110 negotiate an Acct start request containing active service for information (acts 17, 18, 18*a*-18*b*). Upon termination of the CO, an Acct stop message is sent by SSG 106 to CAR 110 (act 19) and subject of reply (act 20). The HO is terminated with the transmission of an Acct stop message to CAR 110 and reply from CAR 110 (act 22).

Directing attention to FIG. 2, illustrates an embodiment of the present invention tailored for EAP-SIM authentication call flows. Acts 201-202 illustrate EAP start message sent from client 100 to AP 102 and AP 102's response requesting identity of client 100. Upon the receipt of identity information from client 100 (act 203), AP 102 sends a RADIUS Access-Request message to CAR 110 at act 204. CAR 110 issues an Access-Challenge message to AP 102 at act 205 and causes AP 102 to send client 100 an EAP-Response/SIM/Challenge message at act 206. Client 100's EAP-Response/SIM/Challenge message to AP 102 at act 207 causes AP 102 to send a RADIUS Access-Request message to CAR 110 at act 208. CAR 110 then sends MAP_SEND_AUTH_INFO to ITP/HLR module 112 at act 209, which responds at act 210. CAR 110 sends a RADIUS Access-Challenge message to AP 102 at act 211. AP 102 issues an EAP-Request/SIM/Challenge message to client 100 at act 212 and the subsequent replies are sent first from client 100 to AP 102 and then from AP 102 to CAR 110 (acts 213*a*, 213*b*). Acceptance is relayed back to client 100 (acts 214*a*, 214*b*). CAR updates its identity cache.

Acct start message from AP 102 including WISPr location attributes that are then cached on SSQ 106 (act 215*a*) and from SSG 106 to CAR 110 (act 215*b*) result in Acct Response sent from CAR 110 to SSG 106 (act 216*a*), the WISPr attributes added to session attributes and sent from SSG 106 to AP 102 at act 216*b*. DHCP is negotiated between client 102 and AZR 104 in acts 217*a*, 217*b*. At act 218, client 100's DHCP request causes AZR 104 to send IP lease notification, acct start message to SSG 106 at act 219*a*, which forwards account start to CAR 110 at act 219*b*. This results in adding an IP address to the session attribute and acts 219*c* and 220. Client 102 sends its first IP packet to SSG 106 (act 221), which responds with a RADIUS Access-Request message to CAR 110 (act 222). The RADIUS Access-Request message contains the SSG TAL feature with Framed IP-add as user name. A Session was created on CAR 110 at act 214*a*, 215*b* and 219*b*, so CAR 110 responds to the request at act 223 with a RADIUS Access-Accept message to SSG with all attributes and the host object is created. If no service is activated, client 100 is redirected to SESM 108. User needs to activate a service from SESM 108. The call flow will be the same as shown in FIG. 1 after the HO is created.

While a method and apparatus for providing location-based services using WISPr attributes in a centralized gateway architecture have been described and illustrated in detail, it is to be understood that many changes and modifications can be made to embodiments of the present invention without departing from the spirit thereof.

What is claimed is:

1. A method comprising:
receiving, by a gateway a first Accounting Start message from an access point associated with a client device, the first Accounting Start message including a Wireless Internet Service Provider roaming (WISPr) attribute that is descriptive of a location of the access point associated with the client device, wherein the gateway is located upstream from access point;
storing, by the gateway, the WISPr attribute corresponding to the location of the access point that is associated with the client device;
transmitting by the gateway, a second Accounting Start message to a server located upstream from the gateway that provides centralized authentication, authorization, and accounting (AAA) management, the second Accounting Start message including the WISPr attribute received by the gateway from the access point in the first Accounting Start message, wherein receiving the second Accounting Start message causes the server to store the WISPr attribute;
subsequently, intercepting, by the gateway, traffic from the client device; and
sending one or more requests to negotiate service for the client device, wherein the one or more requests include the WISPr attribute corresponding to the location of the access point and the service includes providing location dependent content to the client device.

2. The method of claim 1, further comprising:
in response to the client device roaming from the access point to a second access point, receiving a location attribute corresponding to a second location of the second access point.

3. The method of claim 1, wherein the WISPr attribute is received using a remote authentication dial-in user service (RADIUS) protocol.

4. The method of claim 1, wherein the one or more requests are sent to another server implementing a subscriber edge services manager (SESM) that presents a location-dependent web page to the client device.

5. A gateway comprising:
one or more computer processors; and
a memory storing instructions that, when executed by the one or more computer processors, cause the gateway to:
receive a first Accounting Start message from an access point associated with a client device, the first Accounting Start message including a Wireless Internet Service Provider roaming (WISPr) attribute that is descriptive of a location of the access point associated with the client device, wherein the gateway is located upstream from access point;
store the WISPr attribute corresponding to the location of the access point that is associated with the client device;
transmit a second Accounting Start message to a server located upstream from the gateway that provides centralized authentication, authorization, and accounting (AAA) management, the second Accounting Start message including the WISPr attribute received by the gateway from the access point in the Accounting Start message, wherein the second Accounting Start message causes the server to store the WISPr attribute;
subsequently, intercept traffic from the client device; and
send one or more requests to negotiate service for the client device, wherein the one or more requests include the WISPr attribute corresponding to the location of the access point and the service includes providing location dependent content to the client device.

6. The gateway of claim 5, wherein the instructions further cause the gateway to:
in response to the client device roaming from the access point to a second access point, receive a location attribute corresponding to a second location of the second access point.

7. The gateway of claim 5, wherein the WISPr attribute is received using a remote authentication dial-in user service (RADIUS) protocol.

8. The gateway of claim 5, wherein the one or more requests are sent to another server implementing a subscriber edge services manager (SESM) that presents a location-dependent web page to the client device.

9. A non-transitory computer-readable medium storing instructions that, when executed by a gateway, cause the gateway to:
receive a first Accounting Start message from an access point associated with a client device, the first Accounting Start message including a Wireless Internet Service Provider roaming (WISPr) attribute that is descriptive of a location of the access point associated with the client device, wherein the gateway is located upstream from access point;
store the WISPr attribute corresponding to the location of the access point that is associated with the client device;
transmit a second Accounting Start message to a server located upstream from the gateway that provides centralized authentication, authorization, and accounting (AAA) management, the second Accounting Start message including the WISPr attribute received by the gateway from the access point in the first Accounting Start message, wherein receiving the second Accounting Start message causes the server to store the WISPr attribute;
subsequently, intercept traffic from the client device; and
send one more requests to negotiate service for the client device, wherein the one or more requests include the WISPR attribute corresponding to the location of the access point and the service includes providing location dependent content to the client device.

10. The non-transitory computer-readable medium of claim 9, wherein the instructions further cause the gateway to:
in response to the client device roaming from the access point to a second access point, receive a location attribute corresponding to a second location of the second access point.

11. The non-transitory computer-readable medium of claim 9, wherein the WISPr attribute is received using a remote authentication dial-in user service (RADIUS) protocol.

12. The non-transitory computer-readable medium of claim 9, wherein the one or more requests are sent to another server implementing a subscriber edge services manager (SESM) that presents a location-dependent web page to the client device.

* * * * *